United States Patent [19]

Steckel et al.

[11] 4,437,361
[45] Mar. 20, 1984

[54] TATTOOING GUN

[76] Inventors: Lester M. Steckel, Box 235, Taylor, Nebr. 68879; Valeria J. Thomsen, P.O. Box 457, Burwell, Nebr. 68823

[21] Appl. No.: 337,776

[22] Filed: Jan. 7, 1982

[51] Int. Cl.³ .................... B43K 5/00; A61D 1/00
[52] U.S. Cl. .................... 81/9.22; 128/316; 128/330
[58] Field of Search .............. 81/9.22; 128/316, 330

[56] References Cited
U.S. PATENT DOCUMENTS 3,379,176  4/1968  Propst ........................ 128/316
4,392,493  7/1983  Niemeijer .................... 81/9.22

FOREIGN PATENT DOCUMENTS 697196  6/1964  Canada ....................... 128/330

Primary Examiner—Roscoe V. Parker
Attorney, Agent, or Firm—Zarley, McKee, Thomte, Voorhees & Sease

[57] ABSTRACT

A tattooing gun is described for use in tattooing the ears or noses of animals. The gun includes a spring-loaded driving shaft which is movable between cocked and uncocked positions. A driving link mechanism connects the driving shaft to the tattooing needles and needle support so that movement of the driving shaft from its cocked to uncocked positions causes the tattooing needles to be driven forwardly through a muzzle plate into the animal's ear or nose. Tattooing paste or the like is then rubbed on the wound caused by the tattooing needles.

2 Claims, 5 Drawing Figures

TATTOOING GUN

BACKGROUND OF THE INVENTION

This invention relates to a tattooing gun and more particularly to a tattooing gun for use in tattooing animals such as cattle or the like.

Animal ear tags are commonly secured to an animal's ear to aid in the identification thereof. Although ear tags do have certain advantages, one disadvantage in an animal ear tag is that the ear tag may be removed if the animal is stolen. One method of positively identifying an animal which is widely used in the thoroughbred racehorse industry is to tattoo the horse's lip with a tattooing needle. The conventional tattooing needle is difficult to use and the horse's lip must be curled upwardly to read the tattoo.

Therefore, it is a principal object of the invention to provide an improved tattooing gun.

A still further object of the invention is to provide a tattooing gun which may be used to tattoo an animal's ear or nose.

A further object of the invention is to provide a tattooing gun which creates a plurality of openings in the animal's ear or nose in a pre-arranged pattern into which is rubbed tattooing ink or paste.

A further object of the invention is to provide a tattooing gun which is convenient and easy to use.

A still further object of the invention is to provide a tattooing gun which is economical of manufacture and durable in use.

These and other objects will be apparent to those skilled in the art.

SUMMARY OF THE INVENTION

A tattooing gun is disclosed comprising an elongated frame means having a pistol grip handle at one end thereof. A plurality of tattooing needles are movably mounted on the frame means and are connected to a spring-loaded driving shaft by means of a driving linkage. The driving shaft, when moved from its cocked position to its uncocked position, drives the needles forwardly with respect to the frame and causes the needles to pierce the animal's ear or nose. Tattooing ink or paste is then rubbed into the wound to provide a positive means of identifying the animal.

DESCRIPTION OF THE PREFERRED EMBODIMENT

Figure 2:
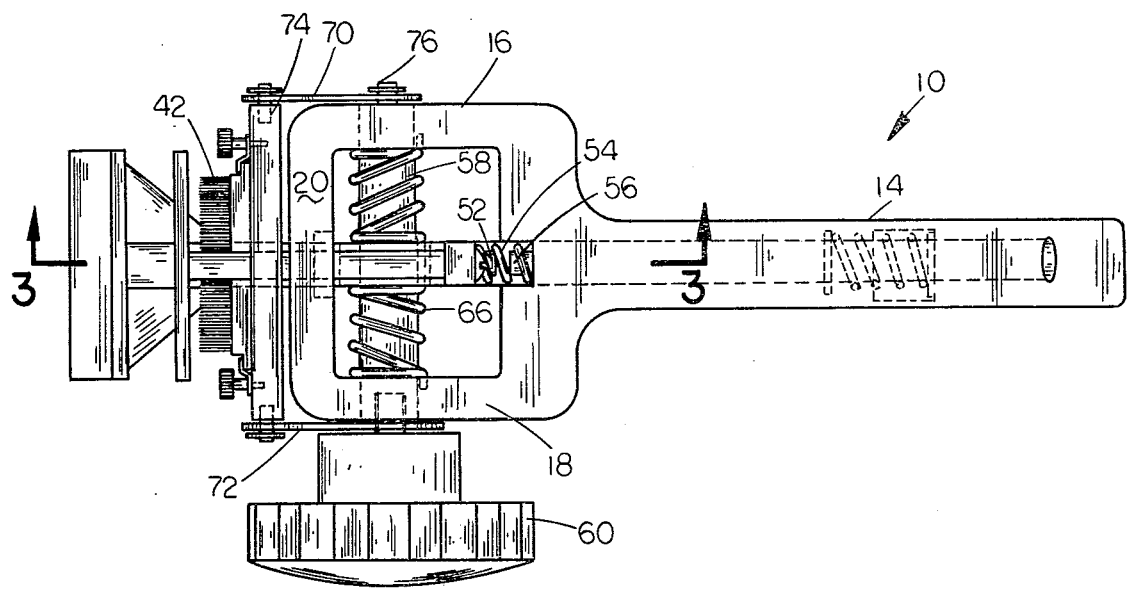
FIG. 2 is a top elevational view of the tattooing gun.
Figure 1:
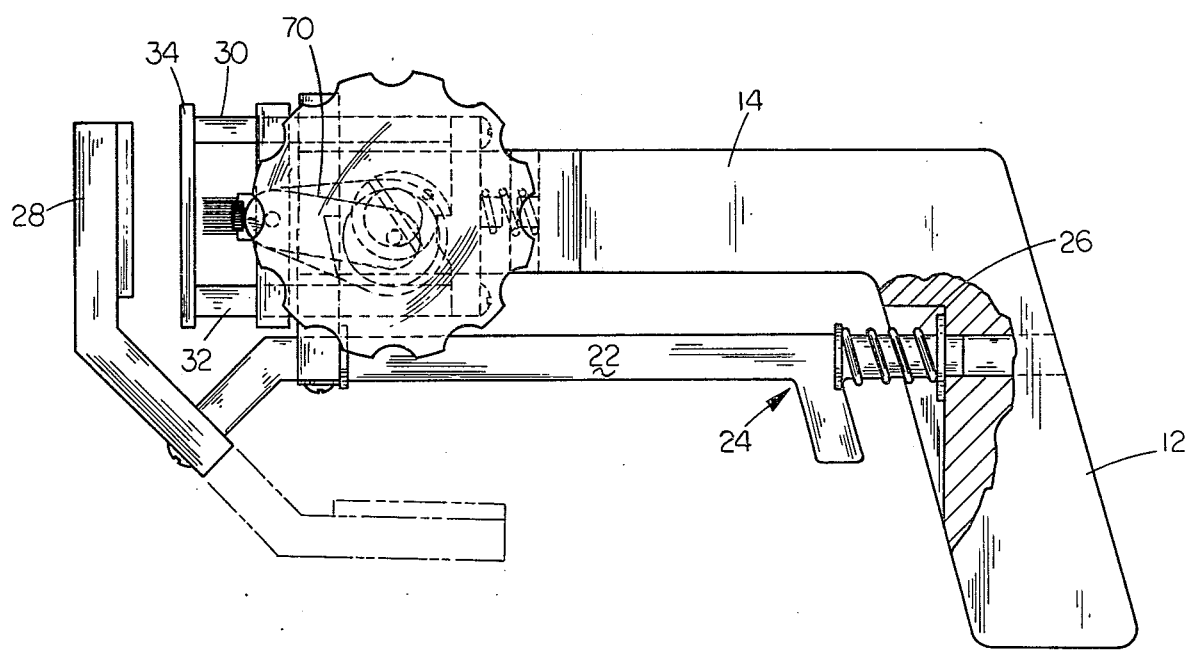
FIG. 1 is a side elevational view of the tattooing gun with portions thereof cut away to more fully illustrate the invention.

The tattooing gun of this invention is referred to generally by the reference numeral 10. Gun 10 includes a handle portion 12 having a shank portion 14 extending forwardly from the upper end thereof as best seen in FIG. 1. A pair of spaced-apart arms 16 and 18 extend forwardly from the forward end of shank portion 14 and have their forward ends connected by means of a wall portion 20. Shank portion 22 of trigger 24 is movably mounted on the lower end of wall portion 20. As seen in FIG. 1, a spring 26 is provided at the rearward end of the shank portion 22 to yieldably urge the trigger 24 forwardly. An ear tattoo backing plate 28 is selectively rotatably mounted on the forward end of the shank portion 22 so that it may be rotated from the position illustrated by solid lines in FIG. 1 to the position illustrated by broken lines in FIG. 1 as will be described in more detail hereinafter.

A pair of vertically spaced arms 30 and 32 slidably extend through suitable openings formed in wall portion 20 and have a muzzle plate 34 mounted on the forward ends thereof by means of screws 36 and 38. Muzzle plate 34 is provided with an opening 40 formed therein to permit the needles 42 to extend therethrough as will be described in more detail hereinafter.

Figure 3:
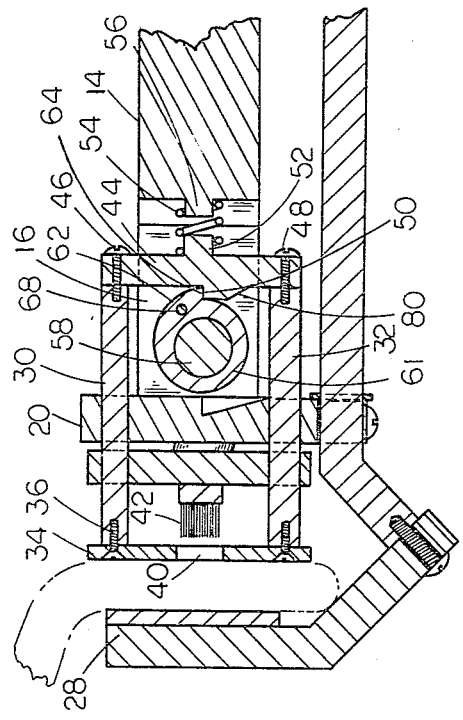
FIG. 3 is a sectional view of the tattooing gun as seen on lines 3—3 of FIG. 2.
Figure 4:
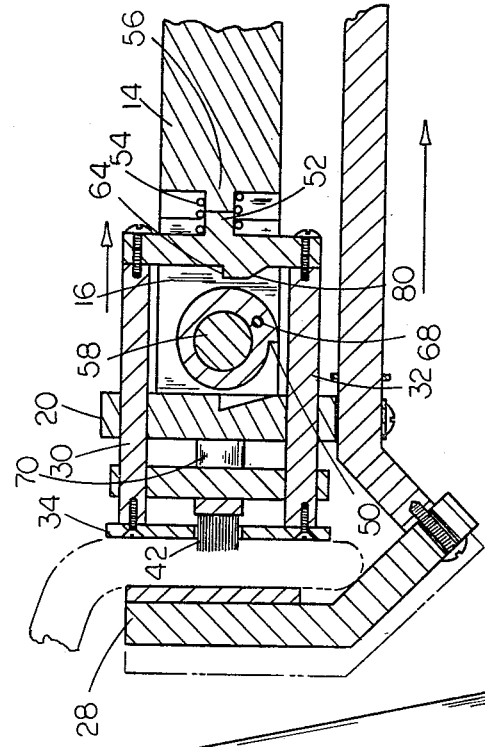
FIG. 4 is a sectional view similar to FIG. 3 except that the needles have penetrated the animal's ear.
Figure 5:
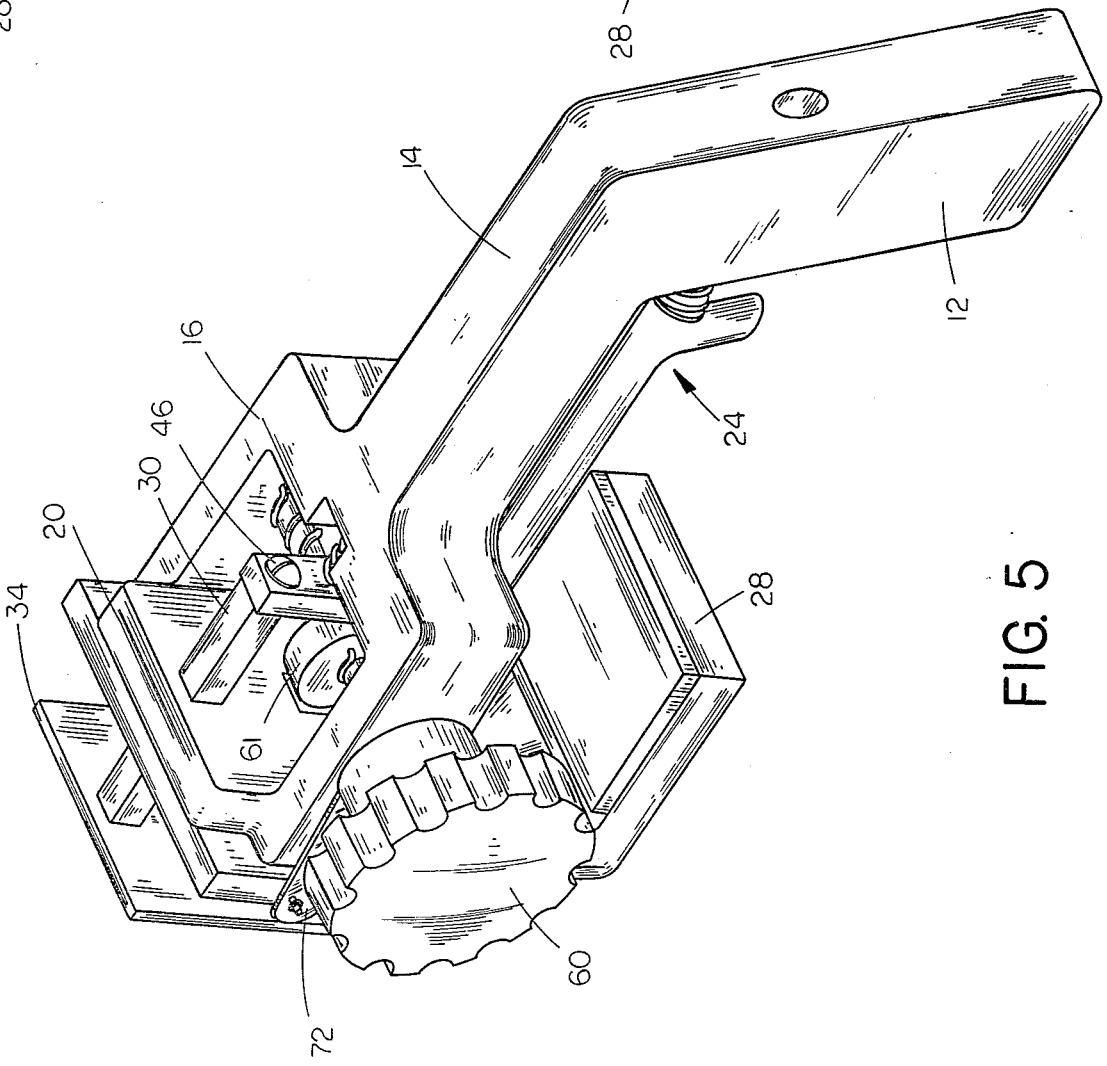
FIG. 5 is a perspective view of the tattooing gun.

Bar 44 is secured to the rearward ends of the arms 30 and 32 by screws 46 and 48 as best illustrated in FIG. 3. Bar 44 is provided with a shoulder 50 at its forward side and a spring retainer portion 52 at its rearward side which is adapted to receive the forward end of a trigger return spring 54. Trigger return spring 54 is mounted on a forwardly presented spring retainer portion 56 provided on shank portion 14.

Shaft 58 has its opposite ends rotatably mounted in arms 16 and 18 and has a cocking knob 60 mounted at one end thereof. Cam wheel 61 is mounted on shaft 58 for rotation therewith and is provided with a cam surface 62 which terminates at cam stop 64 which is adapted to engage shoulder 50. Torsion spring 66 has its opposite ends secured to the arms 16 and 18 and is secured to cam wheel 61 at 68 to yieldably urge cam wheel 61 in a counterclockwise direction as viewed in FIG. 3. Driving links 70 and 72 are pivotally connected at their forward ends to the outer ends of needle support plate 74. As seen in the drawings, the needles 42 are removably mounted on the forward end of the support plate 74 to enable the needles to be changed as desired. The rearward ends of the driving links 70 and 72 are rotatably connected to eccentric pins 76 and 78 provided at the outer ends of the shaft 58.

In operation, knob 60 would initially be rotated in a clockwise direction as viewed in FIG. 1 until cam surface 62 has passed over the cam surface 80 on element 44. Cocking knob 60 is rotated until portion 64 of cam wheel 61 is positioned above the shoulder 50 at which time the trigger return spring 54 urges the bar 44 forwardly so that shoulder 50 engages portion 64. Thus, the cam wheel 61 is then in its cocked position and is held in position by the shoulder 50.

If an animal's ear is to be tattooed, the ear tattoo backing plate 28 is rotated to the position illustrated by solid lines in FIG. 1. The ear of the animal is then positioned between the rearward side of the backing plate 28 and forwardly of the muzzle plate 34. Trigger 24 would then be moved rearwardly to move the backing plate 28 rearwardly to cause the ear to be securely positioned between the backing plate 28 and the muzzle plate 34. Forward pressure is then applied to the handle 12 which causes the muzzle plate 34 to be moved rearwardly relative to the handle so that the shoulder 50 is moved out of engagement with the portion 64 on the cam wheel 60. When shoulder 50 has been moved rearwardly from engagement with the portion 64, torsion spring 66 causes the shaft 58 to rotate quickly in a clockwise direction as viewed in FIG. 3. Clockwise rotation of the shaft 58 causes the driving links 70 and 72 to drive the needle support plate 74 in a forwardly manner so that the needles 42 are driven outwardly through the opening 40 in muzzle plate 34. The needles 42 pierce the animal's ear and create openings therein. A suitable tattooing ink or paste is then rubbed into the openings created by the needles so that the tattoo is created. A suitable tattooing paste is Glidden A-131 Electrolytic Iron Powder manufactured by Glidden Metals, Western Reserve Bldg., 1468 West 9th Street, Cleveland, Ohio 44113. Preferably, the tattooing paste has a mesh of 325. Thus, once the tattooing paste has been rubbed into the openings, a particular identification pattern will be visible. Further, since the tattooing paste has iron particles therein, the tattoo may be read with suitable electronic means which does not form a part of this invention.

After the tattooing operation has been completed, the trigger return spring 54 causes the muzzle plate 34 to move forwardly beyond the outer ends of the needles 42 thereby causing the needles 42 to be removed from the animal's ear. Pressure on the trigger portion 24 is then released so that the tool may be removed from the animal's ear.

If the animal's nose is to be tattooed rather than the ear, backing plate 28 is rotated from the position of the solid lines in FIGS. 1 and 3 to the position illustrated by broken lines in FIG. 1.

Thus it can be seen that a novel tattooing gun has been provided which is not only easy to use but which provides a means for tattooing an animal which will aid in the prevention of the shipment and sale of stolen animals. Thus it can be seen that the invention accomplishes at least all of its stated objectives.

We claim:

1. An animal tattooing gun comprising,
a frame means having rearward and forward ends,
a plurality of tattooing needles selectively movably mounted at the forward end of said frame means,
said needles being movable between a rearward non-tattooing position to a forward tattooing position,
resilient means operatively connected to said needles for selectively rapidly moving said needles from their said non-tattooing position to their said tattooing position whereby said needles will penetrate a portion of the animal to create tattoo openings therein,
selective locking means for maintaining said needles in their said non-tattooing position,
and means at the forward end of said frame means for engagement with the animal and operatively connected to said locking means whereby sufficient pressure thereon will disengage said locking means to cause said needles to move to their said tattooing position.

2. A tattooing gun comprising,
an elongated frame means having rearward and forward ends,
a handle portion at the rearward end of said frame means,
a driving shaft means rotatably mounted on said frame means rearwardly of the forward end thereof and having its longitudinal axis disposed transverse to the length of said frame means;
a needle support means on said frame means and being longitudinally movable between first and second positions,
a plurality of tattooing needles mounted on said needle support means and extending forwardly therefrom,
a muzzle plate on said frame means forwardly of said needles and having an opening formed therein to permit said needles to pass therethrough when said needle support means is moved to its said second position, said muzzle plate being movable between first and second positions,
means operatively connecting said driving shaft means to said needle support means whereby rotation of said driving shaft means in one direction will cause said needle support means to be moved from its said first position towards its said second position,
a spring means connected to said driving shaft means for yieldably rotatably urging said shaft means in said one direction,
said driving shaft means being movable between cocked and uncocked positions,
the rotation of said driving shaft means in a direction opposite to said one direction causing said spring means to be placed in a state of tension,
means for maintaining said driving shaft means in said cocked position,
means for releasing said driving shaft means from its cocked position whereby said needles will be driven forwardly through the opening in said muzzle plate and into the animal,
and means for releasing said driving shaft means from its cocked position.

* * * * *